(12) United States Patent
Chaumonnot et al.

(10) Patent No.: US 8,563,135 B2
(45) Date of Patent: *Oct. 22, 2013

(54) MESOSTRUCTURED ALUMINOSILICATE MATERIAL MADE OF SPHERICAL PARTICLES OF SPECIFIC SIZE

(75) Inventors: Alexandra Chaumonnot, Lyons (FR); Aurelie Coupe, Noisiel (FR); Clement Sanchez, Gif-sur-Yvette (FR); Cedric Boissiere, Paris (FR); Michel Martin, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 253 days.

This patent is subject to a terminal disclaimer.

(21) Appl. No.: 12/935,335

(22) PCT Filed: Feb. 26, 2009

(86) PCT No.: PCT/FR2009/000209
§ 371 (c)(1),
(2), (4) Date: Dec. 21, 2010

(87) PCT Pub. No.: WO2009/122022
PCT Pub. Date: Oct. 8, 2009

(65) Prior Publication Data
US 2011/0105300 A1 May 5, 2011

(30) Foreign Application Priority Data
Mar. 31, 2008 (FR) ...................... 08 01763

(51) Int. Cl.
*B32B 1/00* (2006.01)
*B29B 9/16* (2006.01)
*B01J 29/06* (2006.01)

(52) U.S. Cl.
USPC ............... 428/404; 428/403; 502/60; 502/63; 502/64; 502/69

(58) Field of Classification Search
None
See application file for complete search history.

(56) References Cited

U.S. PATENT DOCUMENTS

| 7,101,523 B2 * | 9/2006 | Mori et al. .................. 423/338 |
| 7,807,598 B2 * | 10/2010 | Euzen et al. .................. 502/71 |
| 7,851,320 B2 * | 12/2010 | Chaumonnot et al. ........ 438/335 |
| 2006/0030477 A1 | 2/2006 | Chaumonnot et al. |
| 2006/0292054 A1 | 12/2006 | Chaumonnot et al. |
| 2009/0232720 A1 | 9/2009 | Chaumonnot et al. |

FOREIGN PATENT DOCUMENTS

| EP | 1 627 852 A1 | 2/2006 |
| EP | 1 627 853 A1 | 2/2006 |

OTHER PUBLICATIONS

International Search Report of PCT/FR2009/000209 (Oct. 6, 2009).

* cited by examiner

*Primary Examiner* — Monique Jackson
(74) *Attorney, Agent, or Firm* — Millen, White, Zelano & Branigan, P.C.

(57) ABSTRACT

A mesostructured aluminosilicate material is described, which consists of at least two elementary spherical particles, each one of said spherical particles consisting of a matrix based on silicon oxide and aluminium oxide, said matrix having a pore diameter ranging between 1.5 and 30 nm, a Si/Al molar ratio at least equal to 1 and amorphous walls of thickness ranging between 1 and 30 nm, said elementary spherical particles having a diameter D such that $10<D(\mu m) \leq 100$. A method of preparing said material and its application in the spheres of refining and petrochemistry are also described.

13 Claims, No Drawings

MESOSTRUCTURED ALUMINOSILICATE MATERIAL MADE OF SPHERICAL PARTICLES OF SPECIFIC SIZE

FIELD OF THE INVENTION

The present invention relates to the field of mesostructured aluminosilicate materials with a high aluminium content. It also relates to the preparation of these materials that are obtained using the EISA (Evaporation Induced by Self-Assembly) method. Thanks to their structural and textural properties, and to their acido-basic properties, the materials according to the invention are particularly well-suited for applications in the sphere of refining and petrochemistry.

BACKGROUND OF THE INVENTION

New synthesis strategies allowing to obtain materials of well-defined porosity in a very wide range, from microporous materials to macroporous materials to hierarchical porosity materials, i.e. having pores of several sizes, have known a very large development within the scientific community since the mid-90s (G. J. de A. A. Soler-Illia, C. Sanchez, B. Lebeau, J. Patarin, Chem. Rev., 2002, 102, 4093). Materials whose pore size is controlled are obtained. In particular, the development of synthesis methods referred to as "soft chemistry" has led to the elaboration of mesostructured materials at low temperature through the co-existence, in aqueous solution or in solvents of marked polarity, of inorganic precursors with structuring agents, generally molecular or supramolecular surfactants, ionic or neutral. Control of electrostatic interactions or through hydrogen bonds between the inorganic precursors and the structuring agent jointly linked with hydrolysis/condensation reactions of the inorganic precursor leads to a cooperative assembly of the organic and inorganic phases generating micelle aggregates of surfactants of uniform and controlled size within an inorganic matrix. This cooperative self-assembly phenomenon governed, among other things, by the structuring agent concentration, can be induced by progressive evaporation of a solution of reactants whose structuring agent concentration is lower than the critical micelle concentration, which leads to either the formation of mesostructured films in the case of a deposition on substrate (dip-coating technique) or to the formation of a mesostructured powder after atomization (aerosol technique) or draining of the solution. By way of example, patent U.S. Pat. No. 6,387,453 discloses the formation of mesostructured organic-inorganic hybrid films by means of the dip-coating technique, and these authors have furthermore used the aerosol technique to elaborate mesostructured purely silicic materials (C. J. Brinker, Y. Lu, A. Sellinger, H. Fan, Adv. Mat., 1999, 11, 7). Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed. For example, the M41S family initially developed by Mobil (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834), consisting of mesoporous materials obtained using ionic surfactants such as quaternary ammonium salts, having a generally hexagonal, cubic or lamellar structure, pores of uniform diameter ranging from 1.5 to 10 nm and amorphous walls of thickness of the order of 1 to 2 nm, has been widely studied.

Later, in order to increase the hydrothermal stability properties while developing acido-basicity properties relative to these materials, the incorporation of the element aluminium in the amorphous silicic framework by direct synthesis or post-synthesis processes has been particularly studied, the aluminosilicate materials obtained having a Si/Al molar ratio ranging between 1 and 1000 (S. Kawi, S. C. Shen, Stud. Surf. Sci. Catal., 2000,129, 227 ; S. Kawi, S. C. Shen, Stud. Surf. Sci. Catal., 2000,129, 219; R. Mokaya, W. Jones, Chem. Commun., 1997, 2185). The hydrothermal stability and acido-basicity properties thus developed by these aluminosilicates have however not allowed them to be used at an industrial stage in refining or petrochemistry processes, which has progressively led to the use of new structuring agents such as amphiphilic macromolecules of block copolymer type, the latter leading to mesostructured materials having a generally hexagonal, cubic or lamellar structure, pores of uniform diameter ranging from 4 to 50 nm and amorphous walls of thickness ranging from 3 to 7 nm. Unlike the dip-coating or aerosol techniques described above, the materials thus defined are not obtained through progressive concentration of the inorganic precursors and of the structuring agent within the solution where they are present, they are conventionally obtained by direct precipitation within an aqueous solution or in solvents of marked polarity by using the value of the critical micelle concentration of the structuring agent. Furthermore, synthesis of these materials obtained by precipitation requires a ripening stage in an autoclave and all the reactants are not integrated in the products in stoichiometric proportion since they can be found in the supernatent. Depending on the structure and on the organization degree required for the final mesostructured material, these syntheses can take place in an acidic medium (pH≈1) (WO-99/37,705) or in a neutral medium (WO-96/39,357), the nature of the structuring agent used also playing an essential part. The elementary particles thus obtained have no regular shape and they are generally characterized by a size above 500 nm. The mesostructured aluminosilicate materials thus obtained exhibit increased hydrothermal stability properties in relation to their homologs synthesized via other structuring agents, their acido-basicity properties remaining more or less similar (1<Si/Al <1000). Low Si/Al molar ratio values are however difficult to obtain because large amounts of aluminium are not readily incorporated in the material via these particular operating methods (D. Zaho, J. Feng, Q. Huo, N. Melosh, G. H. Fredrickson, B. F. Chmelke, G. D. Stucky, Science, 1998, 279, 548; Y. -H. Yue, A. Gédéon, J. -L. Bonardet, J. B. d'Espinose, N. Melosh, J. Fraissard, Stud. Surf. Sci. Catal., 2000,129, 209).

SUMMARY OF THE INVENTION

The invention relates to a mesostructured aluminosilicate material consisting of at least two elementary spherical particles, each one of said spherical particles consisting of a matrix based on silicon oxide and aluminium oxide, said matrix having a pore diameter ranging between 1.5 and 30 nm, a Si/Al molar ratio at least equal to 1 and amorphous walls of thickness ranging between 1 and 30 nm, said elementary spherical particles having a diameter D such that 10<D (μm)≤100. The material according to the invention has a high aluminium content and the Si/Al molar ratio preferably ranges between 1 and 10.

The present invention also relates to the preparation of the material according to the invention. A method of preparing the material according to the invention comprises a) mixing into a solution at least one surfactant, at least one aluminic precursor and at least one silicic precursor; b) aerosol atomizing the solution obtained in stage a) using a spray nozzle that leads to the formation of liquid droplets of diameter less than or equal to 300 μm; c) drying said droplets; d) crushing the solid product obtained in stage c); e) mixing into a solution at least one surfactant, at least one aluminic precursor, at least one silicic precursor and at least a fraction of the solid product obtained in stage d); f) aerosol atomizing the suspension obtained in stage e) using a spray nozzle that leads to the formation of suspended droplets, which are precursors of the constituent spherical elementary particles of diameter D such that 10 <D (μm)≤100 of the material according to the invention; g) drying said droplets obtained in stage f); and h) removing said surfactant so as to obtain a mesostructured porosity material.

RELEVANCE OF THE INVENTION

The aluminosilicate material according to the invention is a mesostructured material consisting of elementary spherical particles, each one of said particles consisting of a matrix based on silicon oxide and on aluminium oxide. Said matrix is mesostructured and it has amorphous walls of thickness ranging between 1 and 30 nm, a uniform pore diameter ranging between 1.5 and 30 nm and a Si/Al molar ratio at least equal to 1. Said spherical elementary particles have a diameter D, expressed in micron, such that 10<D(μm)≤100 and preferably D ranges between 11 and 70 μm. The controllable size of these particles resulting from the implementation and the control of the EISA method by the applicant, as well as their perfectly spherical shape, allow better control of the diffusion of the compounds when using the material according to the invention as a catalyst or an adsorbent for applications in the sphere of refining and petrochemistry, by comparison with the materials known in the state of the art that come in form of elementary particles of non-homogeneous, i.e. irregular, shape. The matrix making up each one of said particles of the material according to the invention advantageously has a Si/Al molar ratio ranging between 1 and 10, more advantageously between 1 and 5. The material according to the invention has a high aluminium content, which confers interesting acido-basicity properties on the material according to the invention for catalysis applications. The material according to the invention is also particularly interesting for the organized porosity it exhibits on the mesopore scale.

DETAILED DESCRIPTION

The object of the present invention is a mesostructured aluminosilicate material consisting of at least two elementary spherical particles, each one of said spherical particles consisting of a mesostructured matrix based on silicon oxide and aluminium oxide, said mesostructured matrix having a pore diameter ranging between 1.5 and 30 nm, a Si/Al molar ratio at least equal to 1 and amorphous walls of thickness ranging between 1 and 30 nm, said elementary spherical particles having a diameter D greater than 10 μm and less than or equal to 100 μm(10<D(μm)≤100).

According to the invention, the matrix based on silicon oxide and aluminium oxide making up each one of said spherical particles of the aluminosilicate material of the invention advantageously comprises a high aluminium content: the Si/Al molar ratio preferably ranges between 1 and 10, and more preferably between 1 and 5.

What is referred to as mesostructured material in the sense of the present invention is a material having an organized porosity on the scale of the mesopores of each one of said spherical particles, i.e. an organized porosity on the scale of the pores of uniform diameter ranging between 1.5 and 30 nm, preferably between 1.5 and 10 nm, homogeneously and evenly distributed in each one of said particles (mesostructuration of the material).

The matrix based on silicon oxide and aluminium oxide, contained in each spherical particle making up the material according to the invention, is mesostructured: it exhibits mesopores having a uniform diameter, i.e. identical for each mesopore, ranging between 1.5 and 30 nm, preferably between 1.5 and 10 nm, homogeneously and evenly distributed in each one of the spherical particles. The matter contained between the mesopores of each one of said spherical particles of the material according to the invention is amorphous and forms walls whose thickness ranges between 1 and 30 nm. The wall thickness corresponds to the distance between a first mesopore and a second mesopore, the second mesopore being the closest pore to said first mesopore. The organization of the mesoporosity described above leads to a structuration of the matrix based on silicon oxide and aluminium oxide that can be hexagonal, two-dimensional hexagonal, vermicular or cubic, preferably vermicular.

According to the invention, said elementary spherical particles making up the material according to the invention have a diameter D, expressed in micron, strictly above 10 μm and less than or equal to 100 μm(10<D(μm)≤100). Preferably, diameter D of said spherical particles advantageously ranges between 11 and 70 μm. According to a particular embodiment of the material according to the invention, said elementary spherical particles have a diameter D ranging between 11 and 50 μm, more preferably between 15 and 50 μm. More precisely, said elementary spherical particles are present in the material according to the invention in form of aggregates.

The material according to the invention advantageously has a specific surface area ranging between 200 and 1200 m$^2$/g, more advantageously between 300 and 1000 m$^2$/g.

The present invention also relates to the method of preparing the material according to the invention. A method of preparing the material according to the invention, referred to as "main preparation method according to the invention", comprises a) mixing into a solution at least one surfactant, at least one aluminic precursor and at least one silicic precursor; b) aerosol atomizing the solution obtained in stage a) using a spray nozzle that leads to the formation of liquid droplets of diameter less than or equal to 300 μm; c) drying said droplets; d) crushing the solid product obtained in stage c); e) mixing into a solution at least one surfactant, at least one aluminic precursor, at least one silicic precursor and at least a fraction of the solid product obtained in stage d) so as to form a suspension; f) aerosol atomizing the suspension obtained in stage e) using a spray nozzle that leads to the formation of suspended droplets, which are precursors of the constituent spherical elementary particles of diameter D such that 10<D (μm)≤100 of the material according to the invention; g) drying said droplets obtained in stage f); and h) removing said surfactant introduced in stages a) and e) so as to obtain a mesostructured porosity material.

According to said main preparation method of the invention, the fraction of solid product obtained in stage d) and used for carrying out said stage e) represents 1 to 100 wt. %, preferably 1 to 80 wt. % and more preferably 5 to 50 wt. % of the total amount of solid product crushed in stage d).

According to a first particular embodiment of the main preparation method of the invention, only part of the solid product from stage c) is crushed during stage d) of the method of the invention; the non-crushed part is generally not used later.

According to a second particular embodiment of the main preparation method of the invention, a surfactant removal stage h) is carried out prior to the crushing stage according to stage d) so that said stage d) is conducted on a solid product free of organic surfactants. Stages a), b), c), h), d), e), and f) that have become consecutive in the particular case of said second preparation method according to the invention are followed by a new cycle of droplet drying and removal of the surfactant introduced in stage e) as described according to stages g) and h).

For the particular case of the material according to the invention consisting of elementary spherical particles having a diameter D ranging between 11 and 50 µm, preferably between 15 and 50 µm, a simplified preparation method, referred to as "simplified preparation method according to the invention", is preferably carried out, which comprises the following stages: a) mixing into a solution at least one surfactant, at least one aluminic precursor and at least one silicic precursor; b) aerosol atomizing the solution obtained in stage a) using a spray nozzle that leads to the formation of liquid droplets of diameter less than or equal to 300 µm; c) drying said droplets; and h) removing said surfactant so as to obtain a mesostructured porosity material.

According to the invention, the volume percentage of non-volatile compounds present in the suspension according to stage e) of the main preparation method of the invention and in the solution according to stage a) of the simplified preparation method of the invention is at least 7%, preferably at least 7.5% and more preferably at least 10%. Said volume percentage of non-volatile compounds is defined as the ratio of the volume occupied by the non-volatile inorganic fraction in form of condensed oxide(s) ($SiO_2$ and $AlO_{1.5}$) in the solid elementary particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in each elementary spherical particle, i.e. $SiO_2$ and $AlO_{1.5}$ coming from either the inorganic precursors present in stage a) and stage e) of the main preparation method according to the invention, to which the inorganic fraction of the solid product of stage c) of the main preparation method of the invention has been added, or from the inorganic precursors present in stage a) of the simplified preparation method according to the invention, and $\rho_{inorg}$ is on average equal to 2 (approximation valid for an "aluminosilicate network" type inorganic fraction). Similarly, the volume occupied by the non-volatile organic fraction $V_{org}$ is defined by ratio $m_{org}/\rho_{org}$ with $m_{org}$=mass of surfactant present in the elementary particle, i.e. the surfactant present in either stage a) and stage e) of the main preparation method according to the invention, to which the organic fraction of the solid product of stage c) of the main preparation method according to the invention has been added, or in stage a) of the simplified preparation method according to the invention, and $\rho_{org}$=1 (approximation valid for a great majority of non-volatile organic fraction). The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

The silicic and aluminic precursors used in stages a) and e) of the main preparation method according to the invention or in stage a) of the simplified preparation method according to the invention are inorganic oxide precursors known to the person skilled in the art. The silicic precursor is obtained from any silica source and advantageously from a sodium silicate precursor of formula $SiO_2,NaOH$, from a chlorine precursor of formula $SiCl_4$, from an organometallic precursor of formula $Si(OR)_4$ where R=H, methyl, ethyl or a chloroalkoxide precursor of formula $Si(OR)_{4-x}Cl_x$ where R=H, methyl, ethyl, x ranging between 0 and 4. The silicic precursor can also advantageously be an organometallic precursor of formula $Si(OR)_{4-x}R'_x$ where R=H, methyl, ethyl, and R' is an alkyl chain or a functionalized alkyl chain, for example by a thiol, amino, β diketone, sulfonic acid group, x ranging between 0 and 4. The aluminic precursor is advantageously an aluminium inorganic salt of formula $AlX_3$, X being a halogen or the $NO_3$ group. Preferably, X is chlorine. The aluminic precursor can also be an organometallic precursor of formula $Al(OR'')_3$ where R''=ethyl, isopropyl, n-butyl, s-butyl or t-butyl, or a chelated precursor such as acetylacetonate aluminium ($Al(C_5H_8O_2)_3$). The aluminic precursor can also be an aluminium oxide or hydroxide.

The surfactant used in stages a) and e) of the main preparation method of the invention or in stage a) of the simplified preparation method of the invention is an ionic or non-ionic surfactant or a mixture thereof. Preferably, the ionic surfactant is selected from among the phosphonium and ammonium ions, more preferably among the quaternary ammonium salts such as cetyltrimethylammonium bromide (CTAB). Preferably, the non-ionic surfactant can be any copolymer having at least two parts of different polarities conferring amphiphilic macromolecule properties on them. These copolymers can comprise at least one block belonging to the non-exhaustive list of the following polymer families: fluorinated polymers (—[$CH_2$—$CH_2$—$CH_2$—$CH_2$—O—CO—R1—  with R1=$C_4F_9$, $C_8F_{17}$, etc.), biological polymers such as polyamino acids (poly-lysine, alginates, etc.), dendrimers, polymers consisting of poly(alkylene oxide) chains. Generally speaking, any copolymer of amphiphilic character known to the person skilled in the art can be used (S. Förster, M. Antionnetti, *Adv. Mater*, 1998, 10, 195-217; S. Förster, T. Plantenberg, *Angew. Chem. Int. Ed*, 2002, 41, 688-714; H. Cölfen, Macromol. *Rapid Commun*, 2001, 22, 219-252). Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the blocks consists of a poly(alkylene oxide) chain of hydrophilic nature and the other block consists of a poly (alkylene oxide) chain of hydrophobic nature. For a three-block copolymer, at least one of the blocks consists of a poly(alkylene oxide) chain of hydrophilic nature and at least one of the other blocks consists of a poly(alkylene oxide) chain of hydrophobic nature. Preferably, in the case of a three-block copolymer, the poly(alkylene oxide) chains of hydrophilic nature are poly(ethylene oxide) chains denoted by $(PEO)_x$ and $(PEO)_z$, and the poly(alkylene oxide) chains of hydrophobic nature are poly(propylene oxide) chains denoted by $(PPO)_y$, poly(butylene oxide) chains or mixed chains each chain of which is a mixture of several alkylene oxide monomers. More preferably, in the case of a three-block copolymer, a compound of formula $(PEO)_x$—$(PPO)_y$—$(PEO)_z$ is used, where x ranges between 5 and 300, y ranges between 33 and 300 and z ranges between 5 and 300. Preferably, the values of x and z are identical. A compound where x=20, y=70 and z=20 (P123) and a compound where x=106, y=70 and z=106 (F127) are very advantageously used. The commercial non-ionic surfactants known as Pluronic (BASF), Tetronic (BASF), Triton (Sigma), Tergitol (Union Carbide), Brij (Aldrich) can be used as non-ionic surfactants in stages a) and e) of the main method according to the invention or in stage a) of the simplified method according to the invention. For a four-block copolymer, two of the blocks consist of a poly(alkylene oxide) chain of hydrophilic nature and the other two blocks consist of a poly(alkylene oxide) chain of hydrophobic nature.

The solution in which are mixed at least one silicic precursor, at least one aluminic precursor and at least one surfactant according to stages a) and e) of the main preparation method of the invention or according to stage a) of the simplified preparation method of the invention can be acidic, neutral or basic. Preferably, said solution is acidic and it has a maximum pH value of 2, preferably ranging between 0 and 2. The acids used to obtain an acidic solution of maximum pH value equal to 2 are, by way of non-exhaustive example, hydrochloric acid, sulfuric acid and nitric acid. Said solution can be aqueous or it can be a mixture of water and organic solvent, the organic solvent being preferably a polar solvent, notably an alcohol, preferably ethanol. Said solution can also be practically organic, preferably practically alcoholic, the proportion of water being such that hydrolysis of the inorganic precursors is ensured (stoichiometric amount). More preferably, said solution in which are mixed at least one silicic precursor, at least one aluminic precursor and at least one surfactant according to stages a) and e) of the main preparation method of the invention or according to stage a) of the simplified preparation method of the invention is an acidic aquo-organic mixture, more preferably an acidic water-alcohol mixture. Said solution according to stage e) of the main method of the invention also comprises at least a fraction of the solid product obtained in stage d) of the method of the invention.

The silicic precursor and aluminic precursor concentrations are defined by the Si/Al molar ratio of the material according to the invention, said Si/Al molar ratio being at least 1, preferably ranging between 1 and 1000, more precisely between 1 and 10 and more preferably between 1 and 5. The initial concentration in surfactant introduced in the mixture according to stages a) and e) of the main preparation method of the invention or in stage a) of the simplified preparation method of the invention is defined by $c_0$, and $c_0$ is defined in relation to the critical micelle concentration ($c_{mc}$) known to the person skilled in the art. $c_{mc}$ is the limit concentration above which the phenomenon of self-assembly of the surfactant molecules in the solution occurs. Concentration $c_0$ can be less than, equal to or greater than $c_{mc}$, preferably it is less than $c_{mc}$. In a preferred embodiment of the preparation of the material according to the invention, concentration $c_0$ is less than $c_{mc}$ and said solution or the suspension of stage a), respectively stage e) of the main method of the invention or the solution of stage a) of the simplified method of the invention is an acidic water-alcohol mixture.

The mixture atomization stage according to stages b) and f) of the main preparation method of the invention or the mixture atomization stage according to stage b) of the simplified preparation method of the invention produces spherical droplets of diameter less than or equal to 300 μm by using a spray nozzle, and said nozzle can be "mono-fluid" or "bi-fluid" (with control of the pressure of a gas such as compressed air or nitrogen) as it is well known to the person skilled in the art. For example, nozzles from Spraying System Emani can be used ("mono-fluid" nozzle of N22® type or "bi-fluid" of SU4® type for example). The size distribution of these droplets is of lognormal type. Atomization of the solution is carried out in a chamber into which a carrier gas, a dry air/nitrogen mixture for smaller plants and nitrogen alone for larger ones, is sent. According to stages c) and g) of the main preparation method of the invention or according to stage c) of the simplified method of the invention, said droplets are dried. Drying is performed through contact of said droplets with the aforementioned gas, which leads to the progressive evaporation of the solution, respectively of the suspension, for example of the acidic aquo-organic solution, respectively of the acidic aquo-organic suspension, obtained in stage a), respectively stage e) of the main preparation method according to the invention or the progressive evaporation of the solution obtained in stage a) of the simplified preparation method according to the invention, and thus to spherical elementary particles. The outlet temperature providing drying in the atomizer chamber ranges between 80° C. and 450° C. The distribution of the residence time of the droplets or of the particles in the atomization chamber is of the order of some seconds. During stage d) of the main method of the invention, the particles are crushed (air jet mill Netzsch CGS10 for example) and brought down to some μm (3 to 5 μm in general). Depending on the plant, the particles are collected at the outlet of a cyclone or in a bag filter. Drying of the particles according to stages c) and g) of the main method of the invention or according to stage c) of the simplified preparation method of the invention is advantageously followed by an additional thermal treatment at a temperature ranging between 50° C. and 300° C. prior to eliminating the surfactant in stage h) of the main method of the invention or of the simplified method of the invention so as to obtain the mesostructured porosity material according to the invention. Said elimination of the surfactant introduced in stages a) and e) of the main method according to the invention or in stage a) of the simplified method according to the invention is advantageously carried out using chemical extraction processes or thermal treatments, preferably calcination in air in a temperature range from 300° C. to 1000° C., and more precisely in a range from 450° C. to 600° C., during 1 to 24 hours, preferably during 2 to 6 hours.

In cases where the solution of stage a) and stage e) of the main preparation method according to the invention, respectively in cases where the solution of stage a) of the simplified preparation method according to the invention is/are (a) water-organic solvent mixture(s), preferably acidic, it is preferred in stages a) and e) of the main preparation method of the invention or in stage a) of the simplified preparation method according to the invention that the surfactant concentration at the origin of the matrix mesostructuration be lower than the critical micelle concentration, so that the evaporation of said aquo-organic solutions, preferably acidic, in stages b) and f) of the main preparation method according to the invention, respectively the evaporation of said aquo-organic solution, preferably acidic, in stage b) of the simplified preparation method according to the invention induces a micellization or self-assembly phenomenon leading to the mesostructuration of the matrix of the material according to the invention. When $c_0 < c_{mc}$, the mesostructuration of the matrix of the material according to the methods described above is the result of a progressive concentration, within each droplet, of the silicic precursor, of the aluminic precursor and of the surfactant, up to a surfactant concentration $c_0 > c_{mc}$ resulting from an evaporation of each aquo-organic solution, preferably acidic. In general terms, the combined concentration increase of the silicic and aluminic precursors and of the surfactant causes precipitation of the silicic and aluminic precursors around the self-organized surfactant and, consequently, the structuration of the material according to the invention. The inorganic/inorganic phase, organic/organic phase and organic/inorganic phase interactions lead, through a cooperative self-assembly mechanism, to the hydrolysis/condensation of the silicic and aluminic inorganic precursors around the surfactant. Using spray nozzles is particularly advantageous for constraining the reactants present in stages b) and f) of the main method according to the invention or in stage b) of the simplified method according to the invention to interact with one another, no loss of matter, except for the solvents, being possible, all of the elements aluminium and silicon initially present being thus perfectly preserved throughout the process, instead of being eliminated during the filtering and washing stages encountered in conventional synthesis methods known to the person skilled in the art.

Obtaining spherical elementary particles of diameter D such that $10<D(\mu m) \leq 100$ by means of the EISA method, in particular using the aerosol technique, specific to the invention, requires increased knowledge and control of the synthesis operating parameters, essentially for stages a), b), e) and f) of the main preparation method according to the invention or stages a) and b) of the simplified method according to the invention, in order to maintain the mesostructuration process through self-assembly of the surfactant jointly with the hydrolysis/condensation reactions of the various inorganic precursors. In fact, the production of droplets of diameter less than or equal to 300 µm leads to kinetics of evaporation of the aquo-organic solution or suspension that are all the slower since the droplet is large (because proportional to the square of the diameter of the drop to be evaporated). If the total evaporation time is slower than the condensation time of the inorganic matter on the periphery of the drop, a layer of condensed material forms at the evaporation interface, thus forming an additional evaporation barrier. If this additional layer becomes rigid before enough solvent, i.e. water to which an organic solvent has possibly been added, has evaporated, the ratio of the volume of the polar constituents to the volume of the apolar constituents in the mixtures according to stages a) and e) of the main method of the invention or in the mixture according to stage a) of the simplified method of the invention denoted by $V_{pol}/V_{apol} = (V_{inorg} + V_{solvent} + V_{org\,polar})/(V_{org\,hydrophobic})$, a critical parameter that conditions the appearance of a mesostructuration, is variable between the "rigid surface film" and "particle core" zones (with $V_{inorg} = m_{inorg}/\rho_{inorg}$ as defined above in the present description and $V_{org\,polar} + V_{org\,hydrophobic} = V_{org}$ also as defined above in the present description and $V_{solvent}$ = total volume of solvent, the solvent being made up of water and optionally an organic solvent, $V_{org\,polar}$ = volume of the polar parts of the organic reactants, $V_{org\,hydrophobic}$ = volume of the apolar parts of the organic reactants). At the core, the elements present then have to accommodate the mesostructuration to a total volume (defined by the volume inscribed in the rigid skin) greater than the optimum value. If ratio $V_{pol}/V_{apol}$ is too far from the optimum mesostructuration value, the mesostructure homogeneity of the particles produced deteriorates and can disappear to form particles consisting of a well-mesostructured skin and of a non-mesostructured core (amorphous or resulting from a spinodal decomposition depending on the constituent elements and solvents used). In order to avoid this phenomenon likely to impede the elaboration of the material according to the invention, the volume of solvent to be evaporated has to be limited in stages b) and f) of the main method according to the invention, respectively in stage b) of the simplified method according to the invention, in other words, the aerosoled solutions have to be concentrated in order to work preferably with a value $c_0$ close to or greater than $c_{mc}$. This is translated into the presence of non-volatile compounds in the suspension according to stage e) of the main preparation method of the invention and in the solution according to stage a) of the simplified preparation method of the invention, in such an amount that the volume percentage of said compounds present in said suspension, respectively said solution, is at least 7%. The maximum value of this volume percentage is specific to each system and it is mainly limited by three criteria: (i) the lack of stability over time of the solutions obtained in stages a) and e) of the main method of the invention, respectively in stage a) of the simplified method of the invention, (ii) the spontaneous precipitation of the solution at too high concentrations (either through lack of solubility of one or more constituents, or through condensation reaction of the inorganic constituents present in solutions obtained in stages a) and e) of the main method of the invention, respectively in stage a) of the simplified method of the invention), and (iii) the rheological properties of the solutions obtained in stages a) and e) of the main method of the invention, respectively in stage a) of the simplified method of the invention, which may become unsuitable for droplet formation through the spray nozzles (viscosity too high for example).

The mesostructured aluminosilicate material with a high aluminium content according to the present invention can be obtained in form of powder, balls, pellets, granules or extrudates, the shaping operations being performed using conventional techniques known to the person skilled in the art. Preferably, the mesostructured aluminosilicate material according to the invention is obtained in form of a powder consisting of elementary spherical particles having a diameter D such that $10<D(\mu m) \leq 100$, preferably ranging between 11 and 70 µm, which facilitates control of the possible compound diffusion if the material according to the invention is used as a catalyst or an adsorbent in refining or petrochemistry applications.

The mesostructured aluminosilicate material according to the invention is characterized by means of several analysis techniques, notably small-angle X-ray diffraction (SAXD), nitrogen adsorption isotherm, transmission electron microscopy (TEM), X-ray fluorescence (XRF).

The small-angle X-ray diffraction technique (values of angle $2\theta$ ranging between $0.5°$ and $3°$) allows to characterize the periodicity, on the nanometric scale, generated by the organized mesoporosity of the mesostructured matrix of the material according to the invention. In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle $2\theta$ are associated with the inter-reticular distances $d_{(hkl)}$ characteristic of the structural symmetry of the material, ((hkl) being the Miller indices of the reciprocal network) by the Bragg relation: $2\,d_{(hkl)}*\sin(\theta)=n*\lambda$. This indexing then allows to determine the cell parameters (abc) of the direct network, the value of these parameters being a function of the hexagonal, cubic or vermicular structure obtained. For example, the small-angle X-ray diffractogram of a mesostructured aluminosilicate material obtained according to the invention via the use of the particular block copolymer poly(ethylene oxide)$_{20}$-poly(propylene oxide)$_{70}$-poly(ethylene oxide)$_{20}$ (PEO$_{20}$—PPO$_{70}$—PEO$_{20}$ or Pluronic 123) has a perfectly resolved correlation peak corresponding to the correlation distance between pores d characteristic of a structure of vermicular type and defined by the Bragg relation $2\,d*\sin(\theta)=n*\lambda$.

Nitrogen adsorption isotherm analysis, which corresponds to the physical adsorption of nitrogen molecules in the pores of the material via a progressive pressure increase at constant temperature, provides information on the particular textural characteristics of the material according to the invention. In particular, it allows to know the specific surface area and the mesopore distribution of the material. What is referred to as the specific surface area is the BET specific surface area ($S_{BET}$ in m$^2$/g) determined by nitrogen adsorption according to the ASTM D 3663-78 standard established from the Brunauer-Emmett-Teller method described in *"The Journal of American Society"*, 1938, 60, 309. The pore distribution representative of a mesopore population centered in a 1.5-50 nm range is determined by means of the Barrett-Joyner-Halenda (BJH) model. The nitrogen adsorption-desorption isotherm according to the BJH model thus obtained is described in "The Journal of American Society", 1951, 73, 373, written by E. P. Barrett, L. G. Joyner and P. P. Halenda. In the description that follows, the mesopore diameter $\phi$ of the mesostructured matrix corresponds to the mean diameter upon nitrogen desorption defined as a diameter such that all the pores having a size below this diameter make up 50% of the pore volume (Vp) measured on the desorption branch of the nitrogen isotherm. Furthermore, the shape of the nitrogen adsorption isotherm and of the hysteresis loop can give information about the nature of the mesoporosity. For example, the nitrogen adsorption isotherm relative to the mesostructured aluminosilicate material according to the invention, obtained by means of the method of the invention when using the particular block copolymer poly(ethylene oxide)$_{20}$-poly (propylene oxide)$_{70}$-poly(ethylene oxide)$_{20}$ (PEO$_{20}$—PPO$_{70}$—PEO$_{20}$ or Pluronic 123 or P123), is characterized by an adsorption isotherm of class IV and a hysteresis loop of H1 type, the associated pore distribution curve being representative of a population of mesopores of uniform diameter around the 1.5-30 nm range. The difference between the value of the pore diameter $\phi$ and the correlation distance between pores d defined by small-angle XRD as described above allows to have access to quantity e where e=d–$\phi$ and it is characteristic of the thickness of the amorphous walls of the mesostructured matrix making up each spherical particle of the mesostructured aluminosilicate material.

Transmission electron microscopy (TEM) analysis is also a commonly used technique for characterizing the structure of these materials. It allows formation of an image of the solid studied, the contrasts observed being characteristic of the structural organization, the texture or the morphology of the particles observed, the resolution of the technique reaching 0.2 nm maximum. In the description hereafter, the TEM photos are obtained from microtome sections of the sample in order to visualize a section of an elementary spherical particle of the material according to the invention. For example, the TEM images obtained for a mesostructured aluminosilicate material according to the invention, obtained according to the method of the invention when using the copolymer as described above via the use of the particular block copolymer Pluronic 123, exhibit spherical elementary particles having a vermicular mesostructure, the matter being defined by the dark zones. Analysis of the image also allows to have access to parameters d, and e, characteristic of the mesostructured matrix, defined above.

The morphology and the size distribution of the elementary particles were established by analysis of photos obtained by scanning electron microscopy (SEM).

The structure of the mesostructured matrix making up each particle of the material according to the invention can be cubic, vermicular or hexagonal, depending on the nature of the copolymer selected as the structuring agent. By way of example, a mesostructured aluminosilicate material obtained as described above via the use of the particular block copolymer poly(ethylene oxide)$_{20}$-poly(propylene oxide)$_{70}$-poly (ethylene oxide)$_{20}$ (PEO$_{20}$—PPO$_{70}$—PEO$_{20}$ or Pluronic 123) has a vermicular structure.

The present invention relates to the use of a mesostructured aluminosilicate material according to the invention as an adsorbent for pollution control or as a molecular sieve for separation. The object of the present invention thus also is an adsorbent comprising the mesostructured aluminosilicate material according to the invention. It is also advantageously used as an acidic solid for catalysing reactions, for example those taking place in the spheres of refining and petrochemistry.

When the mesostructured aluminosilicate material according to the invention is used as a catalyst, this material can be associated with an inorganic matrix that may be inert or catalytically active and with a metallic phase. The inorganic matrix can be present simply as a binder for holding together the particles of said material in the various forms known for catalysts (extrudates, pellets, balls, powders), or it can be added as a diluent for imposing the conversion degree in a process that would otherwise progress too fast, leading to catalyst fouling due to the formation of a significant proportion of coke. Typical inorganic matrices are notably support materials for catalysts, such as the various forms of silica, alumina, silica-alumina, magnesia, zirconia, titanium, boron oxides, aluminium, titanium, zirconium phosphates, clays such as kaolin, bentonite, montmorillonite, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix can be a mixture of various compounds, in particular of an inert phase and of an active phase. Said material of the present invention can also be associated with at least one zeolite and act as the main active phase or as an additive. The metallic phase can be introduced fully on said material of the invention. It can also be introduced fully on the inorganic matrix or on the inorganic matrix-mesostructured solid assembly, through ion exchange or impregnation with cations or oxides selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir, and any other element from the periodic table.

The catalytic compositions comprising the material of the present invention are generally suited for implementation of the main hydrocarbon conversion processes and organic compound synthesis reactions.

The catalytic compositions comprising the material of the invention advantageously find their application in the following reactions: isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulfurization and hydrodenitrogenation, catalytic elimination of nitrogen oxides, said reactions involving feeds comprising saturated and unsaturated aliphatic hydrocarbons, aromatic hydrocarbons, oxygen-containing organic compounds and organic compounds containing nitrogen and/or sulfur, as well as organic compounds containing other functional groups.

The invention is illustrated by the following examples.

EXAMPLES

In the examples hereafter, the aerosol technique used is the technique described above in the description of the invention. Example 1 (Invention): Preparation of an Aluminosilicate Material of Si/Al Ratio=4 According to the Main Preparation Method of the Invention 1 kg hexahydrated aluminium trichloride is added to a solution containing 10 kg ethanol, 5 l water, 36 ml HCl and 1.4 kg surfactant CTAB. The assembly is left under stirring at ambient temperature until complete dissolution of the aluminic precursor. 3.6 kg tetraethylorthosilicate (TEOS) are then added. After 10-min stirring at ambient temperature, the assembly is atomized by means of a "mono-fluid" spray nozzle in a chamber into which a carrier gas, a dry air/nitrogen mixture, is sent. The droplets obtained by atomization are dried between 100° C. and 120° C. according to the protocol described in the above description of the invention, in accordance with stage c) of the main method of the invention. The particles are collected in a bag filter. Said particles are crushed by means of a jet mill and brought down to some pm (3 to 5 µm). A 30 wt. % fraction of these crushed particles is then fed again into a solution having the same formulation as the initial solution, then the suspension is atomized again by means of a "mono-fluid" nozzle, as above, and the droplets dried between 100° C. and 120° C. according to the protocol described in the description of the invention above according to stage g) of the main method of the invention. The powder collected in a bag filter is then calcined in air for 5 hours at T=550° C. in order to remove the surfactant (CTAB). The volume percentage of non-volatile compounds present in the suspension prior to the second atomization (stage e) of the main method according to the invention is 10.4%. The solid is characterized by small-angle XRD, nitrogen adsorption isotherm analysis, TEM and XRF. The TEM analysis shows that the final material has an organized mesoporosity characterized by a vermicular structure. Nitrogen adsorption isotherm analysis leads to a specific surface area of the final material $S_{BET}$=800 m²/g and to a mesopore diameter $\phi$=2.4 nm. The small-angle XRD analysis leads to the visualization of a correlation peak at angle 2θ=2.4. The Bragg relation 2 d*sin (1.2)=1.5406 allows to calculate the correlation distance d between the pores of the mesostructured matrix, i.e. d=3.7 nm. The thickness of the walls of the mesostructured material defined by e=d−$\phi$ thus is e=1.3 nm. A SEM image of the spherical elementary particles thus obtained shows that these particles have a size characterized by a diameter ranging between 15 and 100 µm, the size distribution of these particles being around 50 µm.

Example 2 (Invention): Preparation of an Aluminosilicate Material of Si/Al Ratio=9 According to the Main Preparation Method of the Invention 520 g hexahydrated aluminium trichloride are added to a solution containing 10 kg ethanol, 5 l water, 36 ml HCl and 1.4 kg surfactant P123. The assembly is left under stirring at ambient temperature until complete dissolution of the aluminic precursor. 4.0 kg tetraethylorthosilicate (TEOS) are then added. After 18-hour stirring at ambient temperature, the assembly is atomized by means of a "mono-fluid" spray nozzle in a chamber into which a carrier gas, a dry air/nitrogen mixture, is sent. The droplets obtained by atomization are dried between 100° C. and 120° C. according to the protocol described in the above description of the invention, in accordance with stage c) of the main method of the invention. The particles are collected in a bag filter. Said particles are crushed by means of a jet mill and brought down to some µm (3 to 5 µm). A 30 wt. % fraction of these crushed particles is then fed again into a solution having the same formulation as the initial solution, then the suspension is atomized again by means of a "mono-fluid" nozzle, as above, and the droplets dried between 100° C. and 120° C. according to the protocol described in the description of the invention above according to stage g) of the main method of the invention. The powder collected in a bag filter is then calcined in air for 5 hours at T=550° C. in order to remove the surfactant (P123). The volume percentage of non-volatile compounds present in the suspension prior to the second atomization (stage e) of the main method according to the invention is 10.4%. The solid is characterized by small-angle XRD, nitrogen adsorption isotherm analysis, TEM and XRF. The TEM analysis shows that the final material has an organized mesoporosity characterized by a vermicular structure. Nitrogen adsorption isotherm analysis leads to a specific surface area of the final material $S_{BET}$=420 m²/g and to a mesopore diameter $\phi$=5.3 nm. The small-angle XRD analysis leads to the visualization of a correlation peak at angle 2θ=0.72. The Bragg relation 2 d*sin (0.36)=1.5406 allows to calculate the correlation distance d between the pores of the mesostructured matrix, i.e. d=12.2 nm. The thickness of the walls of the mesostructured material defined by e=d−$\phi$ thus is e=6.9 nm. A SEM image of the spherical elementary particles thus obtained shows that these particles have a size characterized by a diameter ranging between 15 and 100 µm, the size distribution of these particles being around 50 µm.

Example 3 (Invention): Preparation of an Aluminosilicate Material of Si/Al Ratio=9 According to the Simplified Preparation Method of the Invention 520 g hexahydrated aluminium trichloride are added to a solution containing 10 kg ethanol, 5 l water, 36 ml HCl and 1.4 kg surfactant P123. The assembly is left under stirring at ambient temperature until complete dissolution of the aluminic precursor. 4.0 kg tetraethylorthosilicate (TEOS) are then added. After 18-hour stirring at ambient temperature, the assembly is atomized by means of a "mono-fluid" spray nozzle in a chamber into which a carrier gas, a dry air/nitrogen mixture, is sent. The droplets obtained by atomization are dried between 100° C. and 120° C. according to the protocol described in the above description of the invention, in accordance with stage c) of the simplified method of the invention. The particles are collected in a bag filter in form of a powder that is then calcined in air for 5 hours at T=550° C. in order to remove the surfactant (P123). The volume percentage of non-volatile compounds present in the solution prior to atomization is 10.4%. The solid is characterized by small-angle XRD, nitrogen adsorption isotherm analysis, TEM and XRF. The TEM analysis shows that the final material has an organized mesoporosity characterized by a vermicular structure. Nitrogen adsorption isotherm analysis leads to a specific surface area of the final material $S_{BET}$=420 m²/g and to a mesopore diameter $\phi$=5.3 nm. The small-angle XRD analysis leads to the visualization of a correlation peak at angle 2$\phi$=0.72. The Bragg relation 2 d*sin (0.36)=1.5406 allows to calculate the correlation distance d between the pores of the mesostructured matrix, i.e. d=12.2 nm. The thickness of the walls of the mesostructured material defined by e=d−$\phi$ thus is e=6.9 nm. A SEM image of the spherical elementary particles thus obtained shows that these particles have a size characterized by a diameter ranging between 11 and 35 µm, the size distribution of these particles being around 25 µm.

The invention claimed is:
1. A mesostructured aluminosilicate material consisting of at least two elementary spherical particles, each one of said spherical particles consisting essentially of a mesostructured matrix based on silicon oxide and aluminum oxide, said mesostructured matrix having a pore diameter ranging between 1.5 and 30 nm, a Si/Al molar ratio at least equal to 1 and amorphous walls of thickness ranging between 1 and 30 nm, said elementary spherical particles having a diameter D ranging between 11 and 70 µm.

2. A material as claimed in claim 1, such that said elementary spherical particles have a diameter D ranging between 11 and 50 μm.

3. A material as claimed in claim 2, such that said elementary spherical particles have a diameter D ranging between 15 and 50 μm.

4. A material as claimed in claim 1, such that the Si/Al molar ratio of said mesostructured matrix ranges between 1 and 10.

5. A material as claimed in claim 4, such that the Si/Al molar ratio of said mesostructured matrix ranges between 1 and 5.

6. A material as claimed in claim 1, such that the pore diameter of said matrix ranges between 1.5 and 10 nm.

7. A material as claimed in claim 1, having a specific surface area ranging between 200 and 1200 m²/g.

8. A material as claimed in claim 7, having a specific surface area ranging between 300 and 1000 m²/g.

9. A material as claimed in claim 1, such that said matrix based on silicon oxide and aluminum oxide has a hexagonal, vermicular, or cubic structure.

10. An adsorbent comprising the mesostructured aluminosilicate material as claimed in claim 1.

11. A catalyst comprising the mesostructured aluminosilicate material as claimed claim 1.

12. A method of preparing a mesostructured aluminosilicate material according to claim 1, comprising: a) mixing into a solution at least one surfactant, at least one aluminic precursor and at least one silicic precursor; b) aerosol atomizing the solution obtained in stage a) using a spray nozzle that leads to the formation of liquid droplets of diameter less than or equal to 300 μm; c) drying said droplets; d) crushing the solid product obtained in stage c); e) mixing into a solution at least one surfactant, at least one aluminic precursor, at least one silicic precursor and at least a fraction of the solid product obtained in stage d) to obtain a suspension such that the volume percentage of non-volatile compounds present in the suspension is at least 7%; f) aerosol atomizing the suspension obtained in stage e) using a spray nozzle that leads to the formation of suspended droplets, which are precursors of the constituent spherical elementary particles of diameter D such that 11<D(μm)<70 of the material; g) drying said droplets obtained in stage f); and h) removing said surfactant introduced in stages a) and e) so as to obtain a mesostructured porosity material, wherein the amounts of aluminic precursor and silicic precursor in stages a) and e) are provided such that the resulting mesostructured matrix has a Si/Al molar ratio of at least 1.

13. A method of preparing a mesostructured aluminosilicate material according to claim 7, comprising: a) mixing into a solution at least one surfactant, at least one aluminic precursor and at least one silicic precursor such that the volume percentage of non-volatile compounds present in the solution is at least 7%; b) aerosol atomizing the solution obtained in stage a) using a spray nozzle that leads to the formation of liquid droplets of diameter less than or equal to 300 μm; c) drying said droplets; and h) removing said surfactant so as to obtain a mesostructured porosity material, wherein the amounts of aluminic precursor and silicic precursor in stage a) are provided such that the resulting mesostructured matrix has a Si/Al molar ratio of at least 1.

* * * * *

UNITED STATES PATENT AND TRADEMARK OFFICE
CERTIFICATE OF CORRECTION

PATENT NO.       : 8,563,135 B2
APPLICATION NO.  : 12/935335
DATED            : October 22, 2013
INVENTOR(S)      : Chaumonnot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 336 days.

Signed and Sealed this
Fifteenth Day of September, 2015

Michelle K. Lee
*Director of the United States Patent and Trademark Office*